United States Patent [19]

Legris

[11] 4,309,050
[45] Jan. 5, 1982

[54] PIPE FITTINGS, AND IN PARTICULAR FOR HIGH PRESSURE FLUID PIPES

[75] Inventor: André Legris, Saint Maur, France

[73] Assignee: Société Anonyme dite: Legris, France

[21] Appl. No.: 164,894

[22] Filed: Jul. 1, 1980

[30] Foreign Application Priority Data

Jul. 6, 1979 [FR] France .................. 79 17572

[51] Int. Cl.³ .............................. F16L 19/06
[52] U.S. Cl. .................... 285/341; 285/342; 285/382.7
[58] Field of Search ........... 285/341, 342, 343, 382.7

[56] References Cited

U.S. PATENT DOCUMENTS

| | | | |
|---|---|---|---|
| 1,851,143 | 3/1932 | Wilson | 285/342 |
| 2,258,528 | 10/1941 | Wurzburger | 285/382.7 X |
| 3,498,646 | 3/1970 | De Puy | 285/341 X |
| 3,695,640 | 10/1972 | Clague | 285/341 X |
| 3,708,186 | 1/1973 | Takagi | 285/382.7 X |
| 3,857,591 | 12/1974 | Voss | 285/341 |

FOREIGN PATENT DOCUMENTS

| | | | |
|---|---|---|---|
| 1475752 | 4/1969 | Fed. Rep. of Germany | 285/382.7 |
| 887813 | 8/1943 | France . | |
| 1571319 | 5/1969 | France . | |
| 2406773 | 5/1979 | France | 285/341 |
| 2437560 | 4/1980 | France . | |

Primary Examiner—Dave W. Arola

[57] ABSTRACT

The present invention relates to improvements in pipe fittings and in particular to fittings for high pressure fluid pipes, the said fittings of the crimping ring type comprising a rigid body provided with a bore and, at one of its ends, a threaded outer part on which is screwed a rigid nut.

The part 3 forming a tight seal cooperates with the gripping part 4 which has several functions: the thin lip 4a is pushed by the seal and comes into close contact with the pipe 5 thereby producing a perfect seal anti-extrusion means, and the conical part 4d locked by tightening determines on the conical part 1d of the body a second perfect seal anti-extrusion means, the face 4e being in resting contact on the face 1b of the body and limiting the tightening of the seal; the rear part of the ring 4 produces the direct clamping of the pipe.

The invention finds an application to ensure the reliable tightness of high pressure pipes.

6 Claims, 4 Drawing Figures

U.S. Patent　　　　Jan. 5, 1982　　　　4,309,050
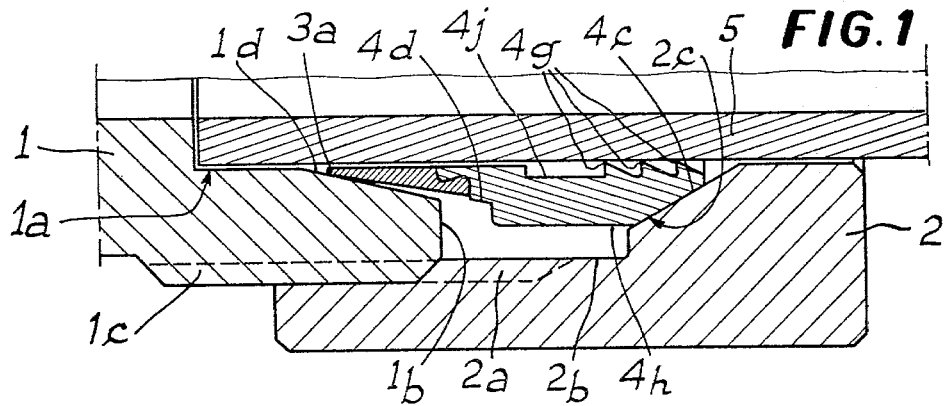
FIG.1
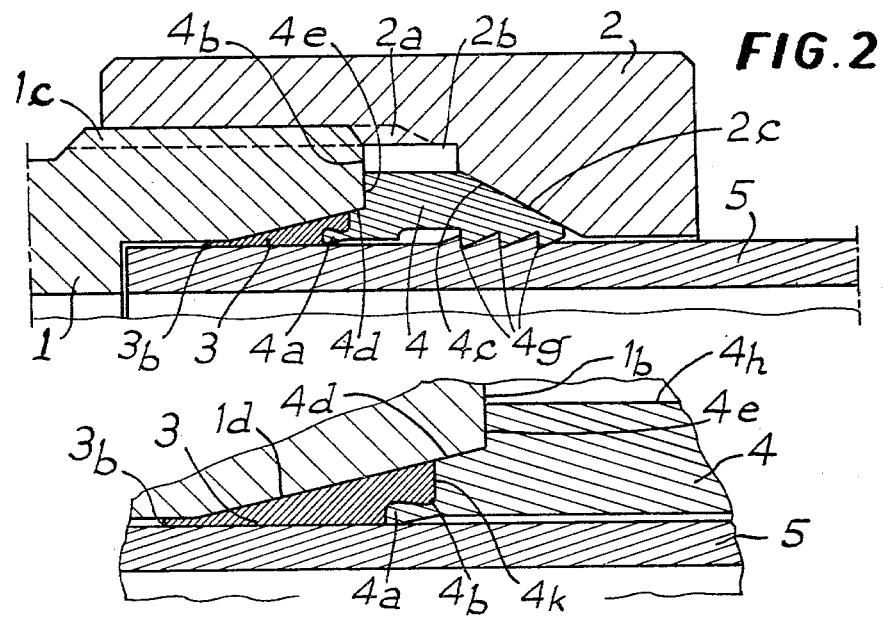
FIG.2
FIG.3
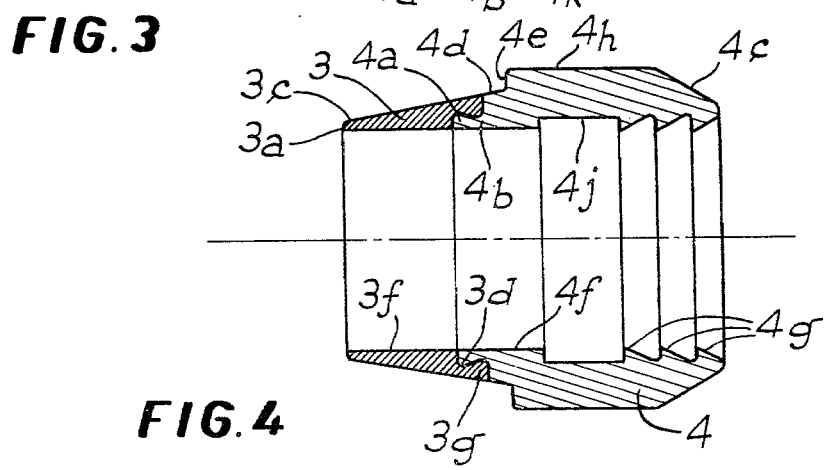
FIG.4

PIPE FITTINGS, AND IN PARTICULAR FOR HIGH PRESSURE FLUID PIPES

The present invention relates to improvements in pipe fittings, and in particular to fittings for metallic pipes intended for pressurized fluids in general, and more particularly high pressure hydraulic servo-control circuits.

In hydraulic servo-control circuits are used welded connector means (flanges etc.) and different types of fittings ensuring a tight connection of the pipes. The present invention concerns such fittings, which comprise a body on which is screwed a nut to ensure the clamping of a collar crimped on the pipe.

The different pressures used in the servo-control hydraulic circuits, the strong surfaces of pressure, the quick cycles of modern machinery and the internal vibrations of fluids subject the pipes and their fittings to very strong stresses, to such a point that the fittings normally used, such as those with a cutting ring, which, a few years ago did seem to be quite satisfactory, are now rejected by the users because of the leaks they cause. Such leaks and oozings of fluid are due to the microcrushing of the metal parts together under the effect of the high stresses involved, of vibrations and of any internal and external strains on the pipe.

Such leaks can also be due to the wrong assembling of conventional fittings, either because the assembling method has not been followed or because of bad workmanship. In large industrial firms, such as the motorcar industry or siderurgy, much oil is wasted through leaks and financial losses are high because of the ever-increasing cost of oil. Moreover, oil leaks caused the formation of stains of floors, hence high cleaning costs, and also, oil leaks in pulverized form are dangerous as they can cause fires.

Large industrial firms need to employ cleaners for those stains, and other staff whose duty it is to tighten or change any leaking fittings.

Profit losses resulting from the use of unreliable fittings are therefore high and users are anxious to avoid them.

For this reason, the research has been directed towards a new generation of highly reliable fittings and the present invention is concerned with fittings of this type.

The conditions required for the use of this type of fitting, and which are very difficult to meet are listed hereunder:

the fitting should be leak-proof between the nil pressure and the test pressure;

the fitting should be leak-proof at low pressure;

the fitting should be leak-proof at a minimum pressure (50 bars for example) by simple manual tightening with low torque;

the fitting should be leak-proof after five successive connecting and disconnecting operations;

the metal parts should not crush under pressure or bleed, and they should not require any tightening for these reasons;

the fitting should not unscrew under the effect of vibrations;

the fitting should withstand temperatures of between −10° and 80° C.;

the tightening torque should be independent of the pipe used;

it should be possible to use pipes with thick or thin walls;

the working life under pressure is at least 20,000 hours or 10 years for the machine on which the fittings are mounted, with about 5 millions pressure cycles;

non-specialized people with only a few hours of training should be capable of mounting the fittings;

the only maintenance required is a quick change of the removable seal, which should be easily accessible, to render the fitting fully leak-proof for another very long period.

It is therefore the aim of the invention to produce fittings fulfilling the aforesaid conditions, i.e. highly reliable fittings not evading any of the required characteristics.

The invention relates to fittings of the crimping ring type comprising a rigid body provided with a bore and, at one of its ends a threaded outer part on which is screwed a rigid nut, the said nut presenting internally and respectively a short cylindrical bore, and, to follow, a conical part which is in contact with a ring made of a ductile metal and crimped on the tube, said ring presenting circular ridges which are engaged in the pipe during the crimping operation, and being provided at one end with a member which constitutes a seal in a deformable material, the hardness of which is less than that of the other part of the metal ring, said part forming seal being in contact with the conical part of the body and with the pipe on which it is engaged.

The fitting according to the invention only comprises a minimum of parts to handle, since the two-part ring is monobloc. In the case of the invention, the assembly is effected by simply tightening the nut, with a reasonable tightening torque, the tool required to do so being a standard spanner.

The use of two parts in different materials to produce the ring ensures a complete and lasting tightness, which is reliable at very high pressures.

The fitting according to the invention can be connected and disconnected ten times at least without impairing its tightness.

Moreover, the part which constitutes the seal can be easily removed and replaced with a new one.

Regarding the nut mounted on the fitting, this cannot be loosened under the effect of vibrations because of the low degree of conicity of the ring and, consequently, the said nut requires no re-tightening and hence, no special maintenance staff assigned to this task.

The material constituting the part forming a seal is suitably selected so that the fitting can resist all the fluids used in the hydraulic servo-control installations, such as synthetic fluid or oil, oil and water mixtures, or glycol and water mixtures.

Finally the fitting according to the invention can withstand the temperatures of hydraulic circuits reaching up to 120° C.

A number of fittings are known which present similarities or seem to have points in common with the fitting according to the invention.

Some are known of which the connecting means to the pipe are used separately from the sealing means which are constituted by annular seals made of a deformable material, and arranged more or less accurately in the necessary spots.

In some existing patents, attempts have been made to solve the fundamental problem which is the anti-extrusion of the seal. In some devices, these attempts have been successful; nonetheless, a more thorough examination nearly always reveals an important defect or a complex construction involving prohibitive costs. Now, no fitting can be perfectly leak-proof without a seal, the metal against metal contacts being doomed because of the metallic micrcocrushing which give rise to microleaks in every case.

The fittings described in French Pat. No. 77 31 968 and 78 27 531 owned by the Applicant, offer a very nearly perfect solution to this problem. But, with those fittings, the user has to groove the pipe when mounting it and this has been deemed an obstacle to the general use of these fittings. Also, the antiextrusion which is effected on one radial face is not completely satisfactory.

The fitting according to the invention aims at the improvement mentioned hereinabove using a very elementary ring, the simplest assembling method and a low-cost fitting.

The known characteristics of the fitting according to the invention reside in the use of a two-part ring, one part of which holds the pipe in position whilst the other constitutes the seal. The fact that the two parts of the ring are gripped or locked by a means of some sort (adherization) is also known.

It is also known to use an abutment, limiting the crushing of the seal, of teeth crimped on the pipe by an adequate conical part acting on the conical part of the nut.

With the device according to the invention, it is possible to use standard and ordinary bodies and nuts, and these are the cheapest ones for uses in high pressure conditions.

According to the present invention, the part of the ring provided with gripping teeth at one of its ends comprises two means which achieve, one independently from the other, a total anti-extrusion of the part forming the seal, the first means being constituted by a conical part of given length, which complements the conical part provided on the body, and the second means being constituted by a thin circular lip situated against the pipe, which lip is crimped and crushed against the said pipe by the seal itself during the fitting, the first means preventing the extrusion of the seal along the cone of the body and the second means preventing the extrusion of the seal along the pipe under the action of high pressures of fluid and of water-hammering resulting from the fluid pressure.

It is possible, with the arrangement according to the invention to group on one very simplified ring, two means allowing the two fundamental antiextrusion functions, necessary with high pressure fittings.

The first means is constituted by the conical part of the ring, presenting a calculated grip against the conical part of the body, the anti-extrusion of the seal (in the fluoplastic state at high pressure and when tightened) being total along the conical part of the body.

The second means is constituted by the thin lip of the metal ring, a part of which has a very thin and pliable cross-section, crimping very strongly on the pipe under the effect of the enormous fluoplastic pressure of the seal when the nut is tightened. The lip produces a total anti-extrusion of the seal against the pipe, under the highest pressures.

According to another characteristic of the invention, the fitting is provided with a predetermined and defined seal housing, in which the seal can only creep through the clearance existing between the pipe and the cylindrical part of the body. However, the seal is chosen to be made of a pliable but not soft material, and it is difficult to cause it to creep in the space determined by the clearance and which is only a few tenths of a millimeter. Moreover, the contact pressures are enormous during the tightening and the seal fills the whole housing, including any defects on the surface of the pipe and of the fitting.

The seal is subjected on the end part directed opposite the clearance to pressure forces similar to those of a tight piston pushing towards the anti-extrusion zones. In this case, the pressure has a self-sealing effect and no pumping effect of the seal is possible.

According to another characteristic of the invention, assembling is simple, as it suffices to push the pipe right to the end of the fitting and to hold it in there, whilst tightening the nut at the decided torque.

Other devices are also known, such as those of U.S. Pat. Nos. 3,857,591 and 1,851,143, in which a conical part holds a seal in position on the pipe and in the body in an attempt to obtain a total anti-extrusion with only one crimped part. But these devices, working with conical parts required to effect at the same time a tightening on the pipe, in dependent manner, have an indefinite axial run and, consequently, it is never a certainty, when starting with the maximum tolerance pipe and with the minimum tolerance pipe, that the seal can be adequately locked in its housing, either because the cone locks the tightening too soon, or because the pipe locks the tightening too soon (with a large pipe), or because the seal in its housing prevents the conical part from reaching the pipe through excessive hardness (with too small a pipe) or else because a deformation of the pipe, too close to its delicate end, restores an excessive volume to the seal, which then works badly. Thus, 80% tight fittings can be mounted and 20% will inexplicably be non-tight.

In the case of French Pat. No. 77 31 968 owned by the Applicant, the fitting comprises an annular seal or "O-ring" which requires the use of a third part, to prevent the movement of the O-ring, and a device necessitating the prior grooving of the pipe, which is discarded by modern users, as it requires too much preparation and care. Moreover, the O-ring is too fragile and its required qualities vary according to the fluids and temperatures. Finally its use is not recommended with pressures exceeding 80 bars.

The fitting according to the invention needs no special care to be taken and can easily withstand pressures of 1,000 bars without any leakage. The degree of tightness is virtually on a par with the mechanical strength of the fitting and of the pipe.

U.S. Pat. No. 3,695,640 relates to an interesting fitting which appears to have succeeded in producing an anti-extrusion of the seal on the conical part of the fitting. On the pipe, on the contrary, the rotating intermediate part shows some clearance and it is easily conceivable that the running clearance with a tube of minium tolerances is about 0.35 mm, so that with such a clearance the material of the seal is easily extruded. The seal does not, therefore, give any guarantee of anti-extrusion along the pipe. This disadvantage can have serious consequences, since the seal loses rapidly its tightness, thereby causing definite leaks in particular along the cone. Anti-extrusion requires strong and clearance-free metal connections, which is the object and aim of the invention due to the independence of the two anti-extrusion means, which give a 100% guarantee of the result, whatever the tolerances of the pipe.

Other fittings exist wherein the seals are used as stuffing boxes, and in particular those described in French Pat. Nos. 887 813 and 1 571 319. But these fittings are only suitable for use with low pressures, because the members holding the seal in position have clearances which, for a pipe with minimum tolerances, can reach 0.35 mm, and this is incompatible with pressures varying between 200 and 600 bars and the surges of pressure which can be between 400 and 1200 bars and definitely entail the creeping of some seals through the clearance.

A remarkable fact to be noted is that the fitting according to the invention permits to reliably solve the problem of tightness over a long period of time whilst respecting completely the conditions of use indicated hereinabove.

The invention will be better understood on reading the following description with reference to the accompanying drawings, in which:

FIG. 1 is a half-view of a longitudinal cross-section of the fitting according to the invention in the fitted position before the tightening of the nut;

FIG. 2 is a similar cross-sectional view in the fitted and tightened position;

FIG. 3 is a longitudinal cross-section of a detail, on an enlarged scale, of the anti-extrusion means; and FIG. 4 is a cross-sectional view of the ring, with its two parts assembled together to constitute a monobloc assembly.

FIGS. 1 and 2 show a fitting according to the invention of the ring crimping type which comprises a rigid body 1 provided with a cylindrical bore 1$a$ extended by a cone-shaped housing 1$d$ and provided at the front with a shoulder 1$b$, and externally with a threading 1$c$ on which is screwed, by a tapped portion 2$a$, a rigid nut 2.

Said rigid nut 2 is provided with a cylindrical bore 2$b$, a conical housing 2$c$ and a tapping 2$a$. The body 1 and the nut 2, when assembled, constitute an inner housing, the outline of which is complementary to a monobloc ring made of two parts 4 and 3 in different materials, one of which, 4, is made of a ductile material, of great strength, such as tempered steel for example, but the surface of which is hardened so as to grip the pipe 5 by the ridges 4$g$, and the other part of which, 3, constitutes a tight seal in deformable material, the hardness of which is less than that of the part 4 of the metal ring. Said part 3 of the ring which forms the tight seal is composed of a pliable material, semi-hard to semiflexible, permitting an elastic deformation of the said part under high compression, which material can be, for example, those materials known as "polyamides" which are chemically resistant to all the known oils, whether synthetic oils or petroleum oils, to the highest temperature, used in hydraulic servo-control systems. The rise in temperature causes a slight softening of the material which behaves as a creeping material, capable of completely adopting the shape of the metal parts with which it is in contact.

Various materials that are plastically deformable under high stresses can be used for part 3 of the ring. Their hardness should be less than that of the metal used for the body 1. Are suitable: loaded or non-loaded plastics, non-ferrous metal in the tempered state, copper, brass, lead, zamac, etc.

Part 4 of the ring (FIG. 4) comprises a thick tubular-shaped central part of external diameter 4$h$ provided with a cylindrical bore 4$j$.

At one end of the ring 4 are provided pipe holding means constituted by the positive gripping teeth 4$g$ which cooperate with a conical part 4$c$ when the nut is screwed tight and when the deformation of the part 4$c$ crimps the ridges on the pipe. When crimped, the device is self-gripping since any backwards movement of the pipe under the effect of pressure causes a tightening of the ridges 4$g$ on the tube 5 and an increase of the gripping and of the penetration.

The device is not new per se, but its association, on the same ring 4 with two seal anti-extrusion means acting independently one from the other, is new.

The new characteristic of the invention resides in the following arrangement.

The fitting object of French Pat. No. 78 27 531 comprises a ring the end of which has no conical part 4$d$ such as indicated in FIG. 4. When the ring is tightened, the material constituting the seal can slip between the face 1$b$ of the body 1 and the face 4$e$ of the ring 4 as long as the said two faces 1$b$ and 4$e$ are not in contact to stop the slipping. The anti-extrusion is therefore only imperfectly achieved, since the slipping of the seal impairs the pressurizing and the crimping of the lip 4$a$.

On the contrary, with the improved fitting according to the invention, the presence of the conical part 4$d$ on the ring, cooperating with a certain amount of tightening, and right from its first contact with the conical part 1$d$ of the body 1, permits, after an already important beginning of compression of the seal 3 by the conical part 1$d$ of the body 1, to totally block the way along the conical part 1$d$, whilst keeping a length of final compression of the seal which makes all slipping impossible, the said length of compression being equal to the length of the anti-extrusion conical part 4$d$ which is specially calculated.

A second anti-extrusion means is associated to the first at the same end of the gripping ring 4. Said second means acting completely independently of the first means 4$d$ is constituted by a lip 4$a$ the cross-section of which is thinned down in 4$b$. Said lip, situated after the conical part 4$d$ at the end of the ring 4, is directly subjected to the fluoplastic deformation stresses of the seal 3 under the effect of the conical part 1$d$, so that the lip is immediately crimped and folded at the level of its thin cross-section 4$b$, as well as tuck with great force on the pipe 5, and this independently of the diameter and the tolerances of the said pipe 5, this being very important. The crimping of the lip 4$a$ on the pipe 5 is thus achieved independently of the tightening of the conical part 4$d$, with the seal 3 itself, as soon as its fluoplastic pressure of deformation is sufficient. Thus, any passages for the seal between the pipe 5 and the ring 4 are efficiently obturated, thereby achieving a perfect and independent anti-extrusion of the said seal 3 on the pipe 5, whatever the pipe tolerances.

It is therefore in the combination of the two means, essential to the anti-extrusion of the pliable seal and acting independently one from the other, namely a conical part having a calculated length of compression and the tightening of which prevents the joint from slipping along the body, and a thin lip fluoplastically crimped by the joint itself onto the pipe in order to prevent the seal from slipping on the pipe, that resides the main characteristic of the invention, such as it is illustrated in FIG. 3.

According to another characteristic of the invention resulting from the preceding arrangement, and wherein two anti-extrusion means are provided at one end of the ring 4, there is provided at the other end of said ring a gripping means constituted of positive gripping teeth tightened on the pipe due to an effect of calculated angle.

FIG. 3 shows in more detail how the seal is locked by the conical part 4d on the conical part of the body 1 and by the lip 4a on the pipe 5.

Considering that the volume of the pliable seal 3 is purposely calculated so as to be slightly greater than its housing, said seal, which is entirely enclosed in the said housing, has to creep into the space left by the clearance 3b between the pipe and the body which space may vary between 0.05 and 0.35 mm. The material of the seal creeps with great difficulty in that small space provided by the clearance and the assembling pressure in the seal housing is thus very high, so that the seal even adopts the defects of the pipe in their smallest details. The tight piston constituted by the material of the seal 3b between the pipe 5 and the body 1 receives the direct pressure and contributes to bring the seal assembly to the working pressure by a squeezing of the seal against the anti-extrusion zones, thereby ensuring tightness. As a result, the seal acts more and more on the anti-extrusion zones, by self-tightness, as the pressure becomes greater. This self-sealing device is excellent for high pressure fittings. When temperatures rise and if the seal is slightly more pliable under heat than under cold, the results of the self-sealing phenomenon are yet improved. Consequently, the material of the seal should be selected in relation to the desired temperatures and pressures. The device is fire-proof, that-is-to-say that there is no risk of leakage if the fitting is caught in a fire and subjected to very high temperatures.

Indeed, with standard fittings and pipes made of steel, if the fitting is red-hot for example, the seal risks to be burnt or to melt, but the combustions residues obturate the anti-extrusion zones by self-sealing effect. Moreover, the conical part 4d constitutes a sealing zone preventing all leaks, and re-inforced by the self sealing of the wastes from the seal. On the pipe, the ridges 4g (FIG. 2) constitute gripping and sealing members which are not affected by the heat, because they are self-gripping and already gripped on the pipe. The tightness of the fittings is re-inforced by the self-sealing of the wastes of the seal 3 in the anti-extrusion zone of the lip 4a on the pipe.

The invention finds applications in all fields where fluids are subjected to very high pressures (up to 400 bars) and in particular, in the hydraulic servo-control of machines. The fitting is particularly used in machine-tools, transfer-machines, agricultural tractors, lifting equipment, cranes and excavators (in the construction of buildings and in public works).

It should be possible with the invention to simplify the production of highly reliable fittings, and thus to achieve long-term savings in oil, manpower, and maintenance and an increase in the safety (accidents and fires) of new installations.

Of course the description is not limitative and can be modified without departing from the scope of the invention.

What is claimed is:

1. An improvement to pipe fittings, and in particular to pipe fittings for high pressure fluid pipe systems, said fittings being of the crimping ring type comprising a rigid body provided with a bore at one end to receive a pipe, the wall of said bore having a conical part, a threaded outer portion at said end, a rigid nut adapted to be screwed into said threaded outer portion, said nut also having a bore to receive the pipe, the wall of the last said bore also having a conical part, a ring made of ductile material for crimping on the pipe and disposed between said conical parts during the crimping operation, the conical part of said nut being in contact with said ring, said ring having circular ridges on one portion thereof which are engaged in the pipe during the crimping operation and being provided at one end with a member which constitutes a seal of a deformable material, the hardness of which is less than the remainder of the ring, said seal being in contact with the conical part of said body and with the pipe, and said portion of the ring having the circular ridges further having first and second means which achieve, one independently of the other, a total anti-extrusion of the member forming the seal, the first means constituting a conical part of given length which complements the conical part of said body, and the second means being constituted by a thin circular lip situated against said pipe, said lip being crimped and crushed against said pipe by the seal itself during fitting, the first means preventing the extrusion of the seal along the conical part of the body and the second means preventing extrusion of the seal along the pipe under the action of high pressures of fluid and of water-hammering resulting from fluid pressure.

2. An improvement to fittings as claimed in claim 1, wherein said one portion of said ring has an abutment face opposing an abutment face on said body, said conical part of the first means being in forced contact with the conical part of the body from the start of its penetration into the body to the abutment of said faces against each other, so that the anti-extrusion of the seal is achieved along the conical part of the body as well as a compression of said seal in an enclosed area over a length equal to the length of the conical part of said first means.

3. An improvement to fittings as claimed in claim 1, wherein said thin lip has a reduced cross-section at the end of the conical part of the first means.

4. An improvement to fittings as claimed in claim 1, wherein the member forming the seal and said one portion of the ring are connected and locked, said member having a conical part associated with the conical part of the first means which extends the latter, said member forming the seal having a bore and said one portion of the ring having a bore which extends the seal bore, and said member forming the seal has undercut parts which cooperate with said lip to ensure the locking of the sealing on said one portion of the ring.

5. An improvement to fittings as claimed in claim 1, wherein said member forming the seal is locked in a housing formed by the conical part of the body, the pipe, an end face adjacent an end of the conical part of the first means, and the lip in completely tight manner in the direction of pressure thrusts, and said member forming the seal has a surplus part which is adapted to engage a space constituted by a very small clearance provided between the pipe and the body, the value of which can vary according to production tolerances between a few hundreths of a millimeter and three or four tenths of a millimeter, said surplus part being arranged as a hollow antagonistic piston with respect to the direction of fluid pressure ensuring the pressurizing of the material of the seal in its housing.

6. An improvement to fittings according to claim 1, wherein the conical part of the first means is locked in with the conical part of the body and constitutes a means for breaking rotation of the ring when the ridges are crimped on the pipe.

* * * * *